No. 11,948.

Reissued Nov. 19, 1901.

O. NEWHOUSE.

LUBRICATING DEVICE.

(Application filed June 20, 1901.)

Witnesses
L. G. Handy
Geo. S. May, Jr.

Inventor;
Oscar Newhouse,
By R. S. Bacon
Assoc. Attorney.

THE NORRIS PETERS CO., PHOTO-LITHO., WASHINGTON, D. C.

UNITED STATES PATENT OFFICE.

OSCAR NEWHOUSE, OF SAN FRANCISCO, CALIFORNIA.

LUBRICATING DEVICE.

SPECIFICATION forming part of Reissued Letters Patent No. 11,948, dated November 19, 1901.

Original No. 668,337, dated February 19, 1901. Application for reissue filed June 20, 1901. Serial No. 65,378.

*To all whom it may concern:*

Be it known that I, OSCAR NEWHOUSE, a citizen of the United States, residing in the city and county of San Francisco, in the State of California, have invented certain new and useful Improvements in Lubricating Devices; and I hereby declare the following to be a full, clear, and exact description of the same.

My invention relates to an apparatus which is designed for use in lubricating axles and shafts of various descriptions, and is particularly designed for the lubrication of such bearings with what are known as "grease," "graphite," or other compounds which are not sufficiently liquid to flow.

It consists of the parts and the construction and combination of parts hereinafter described and claimed.

Figure 2:
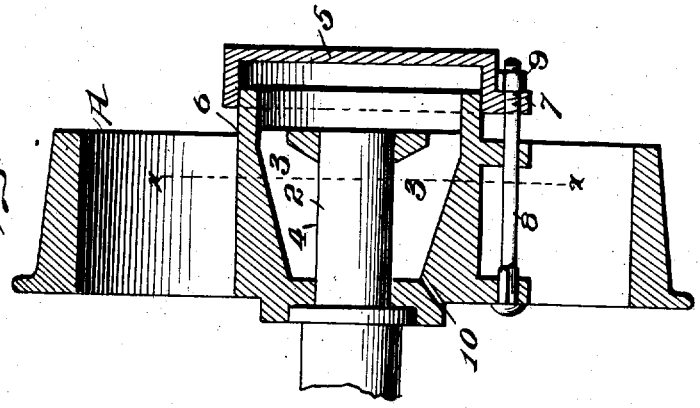
Figure 1:
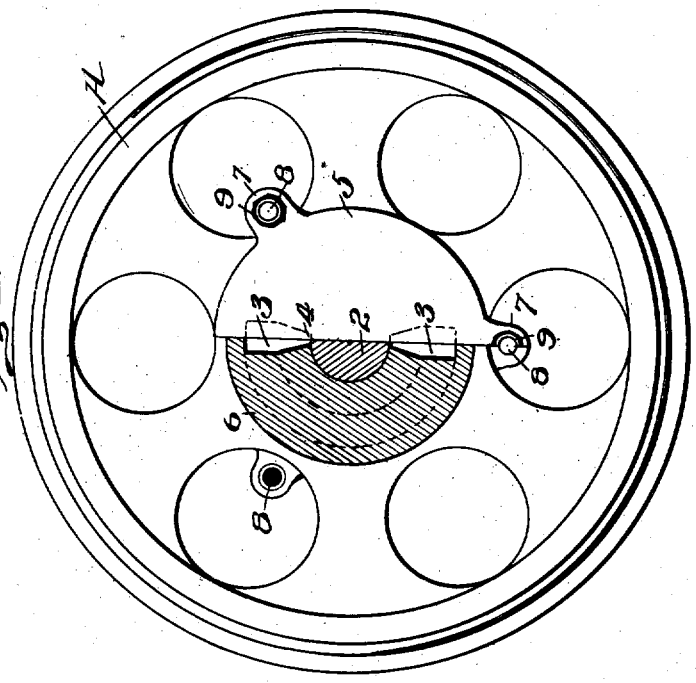

Referring to the accompanying drawings, Figure 1 is a face view of a wheel provided with the improvements, one-half of the hub being shown in section on line *x x* of Fig. 2. Fig. 2 is a longitudinal section of the same.

My invention is designed to apply heavy non-flowing lubricants to axles, shafts, or journal-bearings by means of a direct-pressure mechanism.

In the form shown in the drawings, A represents a wheel turnable upon a shaft or axle 2. Within the hub of this wheel are formed chambers 3, adapted to contain the lubricant. These chambers may be of any suitable size or shape; but in the most preferred and effective form of the invention, as here illustrated, they are of rectangular form in cross-section and tapering from their inner sides toward the axle, where a narrow slit or channel is formed lengthwise of the axles, as at 4, to allow the lubricant to be forced through and into contact with the axle. The chambers taper also longitudinally by the inclining of the back wall toward the axle, as shown. In order to directly apply the lubricant under force, I have shown a cap or plate 5, which in Fig. 1 is shown as fitted to a projecting circular-chambered flange 6. It is here shown as provided with lugs 7, through which bolts 8 pass, and the opposite ends of these bolts are secured upon the opposite side of the wheel-hub. Nuts 9, fitting upon the ends of the bolts, may be turned so as to advance the cap 5 whenever it is desired to apply fresh lubricant to the running parts.

10 is a small opening made from one of the containing boxes or chambers 3 to the exterior for the purpose of allowing any air contained in the box to be expelled when the lubricant is being introduced or at other times.

Certain obvious advantageous functions which distinguish the improvement, particularly in its preferred form, from the devices of the prior art may be mentioned, as follows: First, the tapering of the chambers into a narrow elongated slot, which extends nearly the whole length of the bearing-surface of the shaft or axle, makes it possible to force the grease without requiring unduly great pressure directly against the surface of the shaft or axle. The inclination or taper of the back walls of the chamber also contributes to force the grease directly toward the axle without requiring such undue pressure as would occur with a very stiff grease if the walls were parallel with the shaft and ended abruptly at right angles. A compression-cap 5, fitting over a flange 6, as described, is practically self-cleaning, as it is not interfered with by the dust or dirt that obstructs so many of the familiar forms of lubricating devices. Moreover, the cap can be readily taken hold of to withdraw it when it is desired to refill it with grease, as the surface upon which the cap slides is kept clean by the grease.

It will be observed that the improvement described provides means for forcing grease under pressure around and over the entire bearing-surface, and there is no possible place for dirt or dust to get into the bearing, and if indeed there were any appreciable leakage between the moving parts it would be an outward movement of the grease and would not permit the access of any dust or dirt, because the grease would intersect and prevent the entrance of foreign matter. Finally it will be observed that in the form of the invention shown jarring and centrifugal force will not prevent but tend rather to regulate the grease being pressed against the axle and will not interfere with its passing axially from beneath the cap toward the slits or channels.

Certain parts not strictly relating or material to the invention—such, for instance, as the means for holding the wheel upon the axle, nut-locks, and the like—are omitted for clearness, because such features are familiar in practice.

The improvement may best be used in the following manner: I fill with the lubricating compound the chambers 3 in the hub of the wheel, the hub extension, and the cap 5, and then adjust the cap into position or into pressure-contact with the compound. If the pressure be effected by screw-bolts, as described, I tighten these bolts sufficiently to apply the proper stress to the impounded lubricant, which I can easily determine by the aid of the vent 10, as the compound oozing through these will indicate when it is pressed sufficiently and well and densely packed. According to my experiments a single tightening of the set-bolts will suffice to lubricate a constantly-running car-wheel for one full week with perfect satisfaction, and the lubricant-chambers well charged will hold enough to last several weeks without refilling. I deem it of special importance to keep the lubricant tightly compressed, as by so doing I not only secure its positive and constant application to the bearing, as aforesaid, but have it so closely walled in then that it fills up all interstices to the exclusion of dust and foreign matter which otherwise might penetrate into the hub of the wheel. Thus the lubricant itself is a bar to dirt generally and such matter as dust or grit as would injure either the axle or the axle-box. Whatever comes out at the joints or through the vents is inapplicable if a compound of proper consistency is used, as these are located at the points where the compound remains coolest, and therefore does not run, and so the wheel and axle keep both sound and clean.

Having now described my invention, what I claim as new, and desire to secure by Letters Patent, is—

1. The combination with a stationary and a movable part of a bearing, said bearing having a chamber adapted to contain a lubricant, of a closed cap slidably fitted over the outer end of the bearing, and means engaging the cap exterior to the chamber for advancing the cap to force the lubricant out of said chamber.

2. The combination, with a shaft and an inclosing box, said box having one or more chambers adapted to contain a non-flowing lubricant, and said chambers having contracted outlets leading to the wearing contact-surfaces, of a cap slidably fitting over the ends of the chambers and provided with lugs, and adjusting nuts and bolts between the lugs and box whereby the cap is advanced to force the lubricant into contact with the wearing-surfaces.

3. The combination with a shaft, of a bearing surrounding the shaft and having one or more chambers extending lengthwise of the shaft, tapering from their inner sides toward the shaft, and narrow slits or channels extending lengthwise of the shaft through which the grease may be forced from the chambers directly against the shaft throughout the length of said slits or channels, and adjustable compression means for forcing grease under pressure into and through the said chambers and into contact with the shaft throughout the extent of said slits or channels, substantially as set forth.

4. In combination with an axle, a hub turning thereon, and containing one or more chambers each extending lengthwise of the axle, open at the end and tapering inside toward the axle, where a narrow slit or channel is formed lengthwise of the axle to allow lubricant to be directly forced through into contact with the axle along the entire length of the slit or channel, and a cap slidably mounted substantially grease-tight at the end of said chambers and in direct interior communication therewith, and adjusting screws or bolts mounted to press the cap toward said chamber to force fresh lubricant under pressure along the said chamber and through the said slit or channel, substantially as set forth.

5. In combination with an axle, a hub turning thereon and containing one or more chambers each extending lengthwise of the axle, open at the end, and tapering from the inner sides toward the axle, where a narrow slit or channel is formed lengthwise of the axle to allow lubricant to be directly forced into contact with the axle along the entire length of said slit or channel and also tapered longitudinally toward the axle, and a cap slidably mounted substantially grease-tight over the end of the said chamber and in direct interior communication therewith, and means for pressing the said cap toward said chamber to force fresh lubricant under pressure along the said chamber and through the said slit or channel, substantially as set forth.

6. A wheel provided with a lubricating-chamber arranged longitudinally with respect to the wheel-bearing and open at one end thereof, said chamber tapering inwardly longitudinally from the outer end thereof, and having sides converging toward said bearing, and means for closing the open end of said chamber, substantially as described.

7. A wheel having a hub extending slightly without the end thereof, said hub having a lubricating-chamber opening from one end thereof and terminating in an elongated narrow slit along its interior surface and an adjustable cup-shaped cap fitting the hub extension over the open end of the lubricant-chamber for forcing the lubricant through the slit, substantially as described.

8. A wheel having a chamber lying inward along its bearing having a discharge-opening extending inwardly, a hub extension arranged to supply lubricant to said chamber, and adjustable means for exerting pressure on the contents of said extension, substantially as described.

9. A wheel provided with an interior lubricating-chamber running on the line of its bearing having a discharge-opening extending inwardly, a hub extension forming an enlargement therefor, and an adjustable hollow pressure device associated with said extension and acting upon the lubricant to force it in toward the bearing, substantially as described.

10. The combination of an axle provided with a shoulder, and a wheel on the axle-arm having in one end of its hub a recess for said shoulder and also having a bearing for the outer end of the hub, said hub having an interior lubricating-chamber with an opening beyond said outer bearing and a vent near the axle-shoulder housing and means for closing said opening of the lubricating-chamber, substantially as described.

11. The combination of a journal, a bearing therefor, a lubricating-chamber tapered from one end toward the opposite end thereof, said bearing also having a hollow extension discharging into said chamber at one end thereof, and a pressure-cap for the lubricant slidable against the said extension, substantially as described.

12. A wheel provided with a lubricating-chamber arranged longitudinally with respect to the wheel-bearing, said chamber tapering inwardly longitudinally from the outer end thereof and open to the exterior at said outer end, and having sides converging toward said bearing and a vent-opening near the smaller end of said chamber, and means for closing the opening at the outer end of said chamber, substantially as described.

13. A wheel provided with a hub having a chamber therein extending longitudinally thereof and adapted to receive a non-flowing lubricant, said chamber opening to the exterior at one end, a cup-shaped cap loosely fitting the hub over said open end of the chamber, and means for exerting pressure to said cap for forcing the lubricant through the chamber, substantially as described.

14. The combination with an axle and the bearing thereon provided with a suitable inlet leading to the axle-journal, of a pressure-exerting device in alinement with said axle comprising a lubricant-holding cap fitting over said inlet, and means exterior to said cap associated therewith to exert sufficient pressure to feed the lubricating matter to and press the same against the axle-journals substantially as described.

15. The combination with an axle-journal and the bearing thereon having a chamber and a hollow extension adapted to discharge lubricating matter into said chamber, of a lubricant-holding cap loosely fitting the extension, and adjusting means coöperating with said cap adapted to force the material through said extension and chamber against the axle-journal, substantially as described.

16. The combination with an axle and the bearing thereon having a chamber and a tubular extension arranged to furnish a lubricant-supply to the axle through said chamber, and means for forcing the lubricant through said extension and chamber comprising a lubricant-holding cap in alinement with the axle adapted to constitute a continuation of said extension, and means exterior to the cap for adjusting the same to exert a pressure on the lubricant, substantially as described.

17. The combination with an axle and its bearing having an extension adapted to contain lubricant, a hollow lubricant-holding cap fitting over the end of said extension, and means exterior to the cap for positively adjusting said cap, substantially as described.

18. The combination with an axle and the bearing thereon having an extension adapted to hold and supply lubricant matter through said bearing to the axle-journal, an impressing-cap fitted directly to the end of said extension and adapted to form a continuation thereof, and means connecting said cap and the bearing for adjusting said cap, substantially as described.

19. The combination of an axle and its bearing having an extension adapted to contain lubricant, a pressure-exerting device comprising a lubricant-holding cap fitting said extension, and means exterior to the cap for adjusting the same, substantially as described.

20. The combination of an axle and its bearing having a chamber therein open at one end, a pressure-exerting device fitting over the open end of said chamber comprising a lubricant-holding cap, and adjusting nuts and bolts connecting said cap and bearing for adjusting the cap.

Signed this 18th day of June, 1901, at New York, N. Y.

OSCAR NEWHOUSE.

Witnesses:
C. W. WHEELOCK,
H. S. MORTON.